Oct. 1, 1929.  L. ISACHSEN  1,730,077
COUPLING ARRANGEMENT FOR VEHICLE TRAILERS
Filed July 1, 1927  2 Sheets-Sheet 2
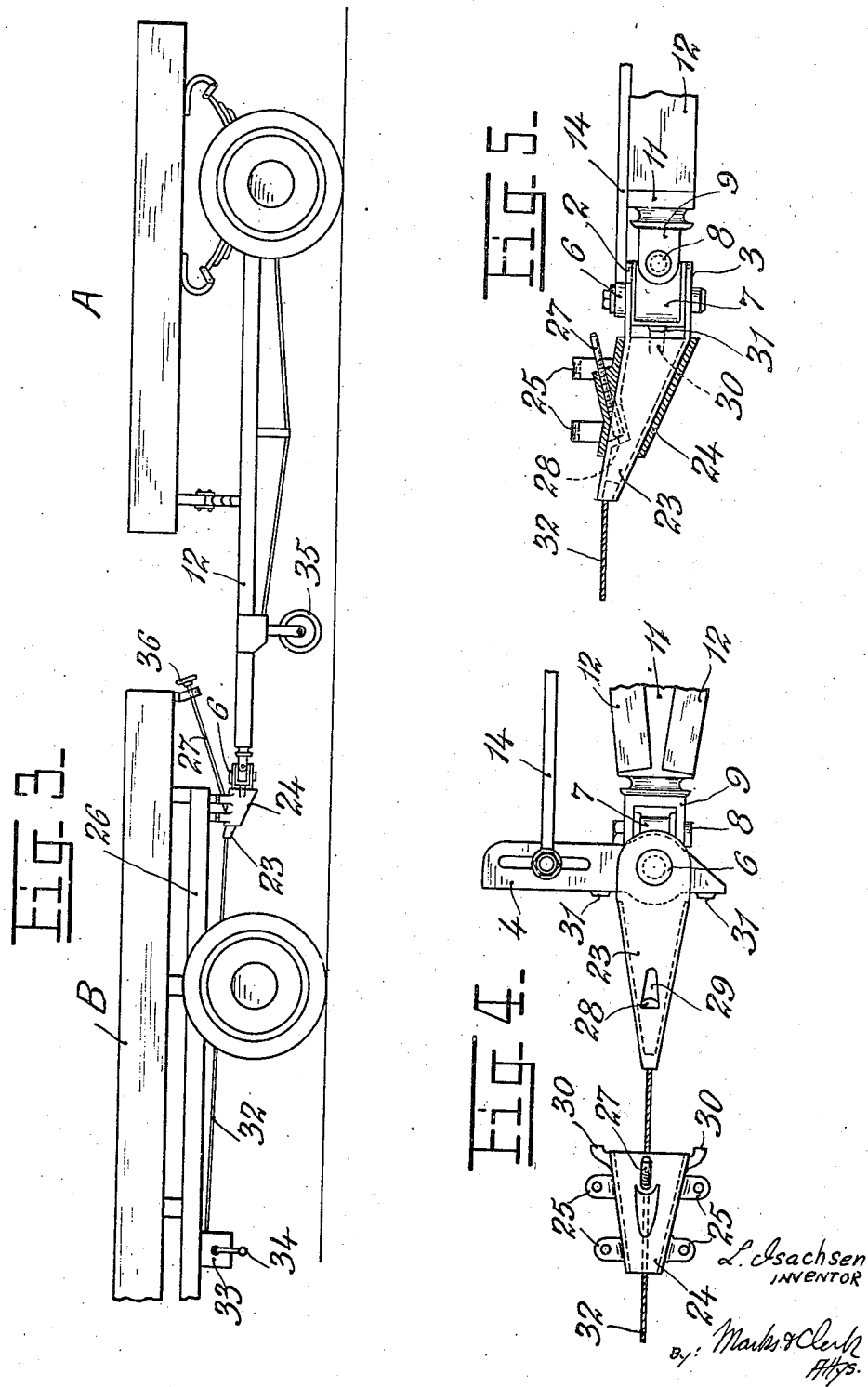

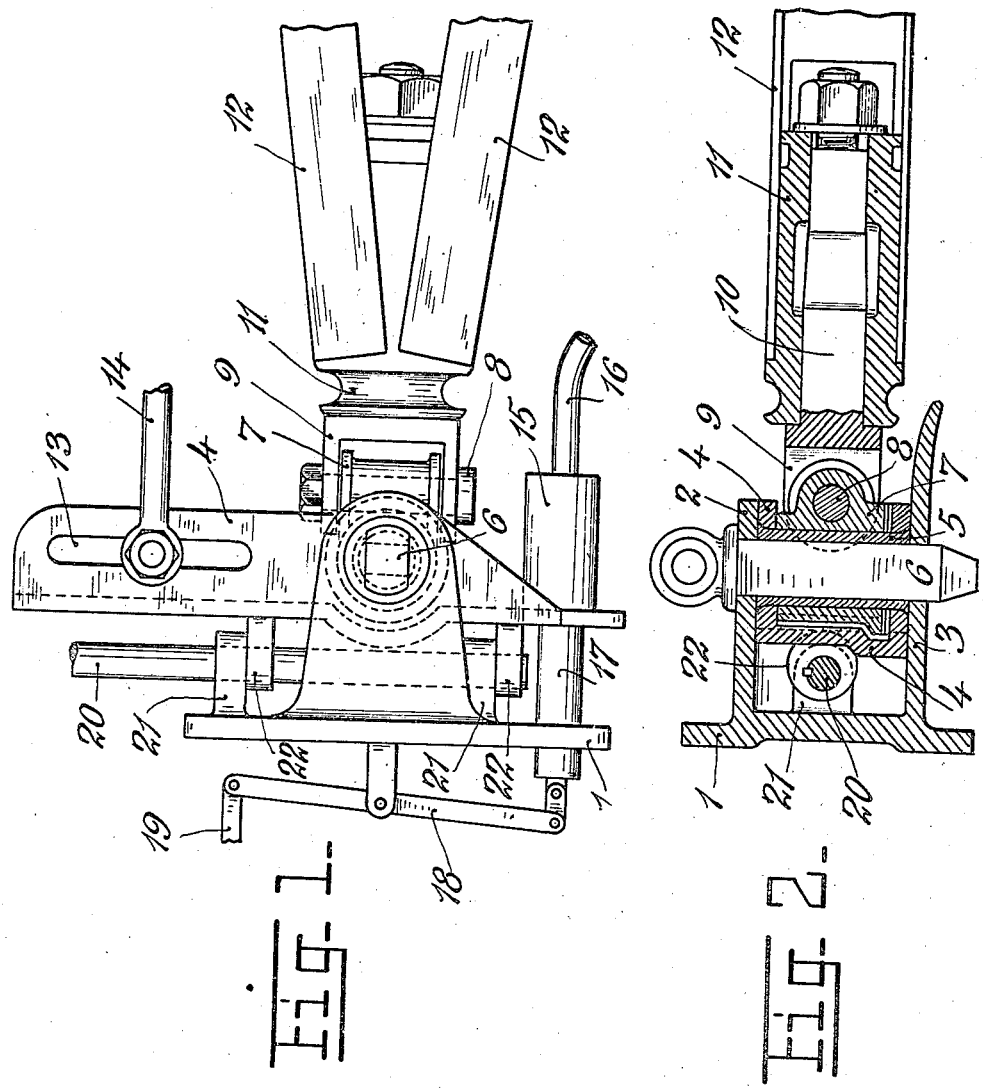

Patented Oct. 1, 1929

1,730,077

UNITED STATES PATENT OFFICE

LUDVIK ISACHSEN, OF LARVIK, NORWAY

COUPLING ARRANGEMENT FOR VEHICLE TRAILERS

Application filed July 1, 1927, Serial No. 202,931, and in Norway October 15, 1926.

The present invention relates to coupling arrangements for vehicle trailers, and it is the object of the invention to provide an arrangement which is simple and effective, and which may be operated by one man even if the trailer is loaded when it is to be coupled to the vehicle.

The invention is illustrated by way of example on the drawing in which

Fig. 1 is a plan view of the coupling device.

Fig. 2 is a longitudinal section therethrough.

Fig. 3 shows, seen from one side, an automobile and a trailer coupled thereto by a somewhat modified coupling device.

Fig. 4 illustrates a somewhat modified coupling device, the parts being separated and Fig. 5 shows the same as Fig. 4 but with the parts coupled together.

The member 1 is secured to the automobile. Said member is provided with an upper flange 2 and a lower flange 3. The lower flange 3 is longer than the upper one and is bent somewhat downwards in order to serve as a guide for a coupling member 4 when such member is introduced between the flanges 2 and 3. The member 4 is channel-shaped and provided with a sleeve 5 through which may be inserted a bolt 6 which thus interconnects the members 1 and 4. The sleeve 5 forms a pivot for one member 7 of a universal link which is provided with a cross pin 8 on which is journalled a fork 9 the end of which consists of a pin 10 which is journalled in a head 11, which head is secured to a frame iron 12 of the trailer.

Thus the trailer may turn about the pin 10, swing in a vertical plane on the pin 8 and in a horizontal plane on the sleeve 5, thus providing a universal connection.

At one side thereof the coupling member 4 is provided with a slot 13, in which is adjustably secured the steering rod 14 of the trailer. At the opposite side is secured a cylinder 15 which through a conduit 16 is in connection with the brakes of the trailer. A piston 17 is slidably journalled in the member 1 and extends into the said cylinder 15. By means of a lever arrangement 18, 19 the said piston 17 may be moved from the driver's seat; or it may be connected to the brakes of the automobile, in such manner that the piston is actuated simultaneously with the brakes. The cylinder 15 is filled with a liquid which through the conduit 16 actuates the brakes of the trailer in a known manner when the piston is pressed into the cylinder.

In order that the members 1 and 4, which are only interconnected by the bolt 6, shall not rattle, an eccentric mechanism is provided, which keeps the member 4 in continuous contact with the bolt 6. Said mechanism consists of a shaft 20 which rests in journals 21 formed in or secured to the member 1. On the shaft 20 are secured two eccentric discs 22, one at each side of the bolt 6, which discs will act against the member 4 when the shaft 20 is turned. The shaft 20 and the discs 22 may be secured in such active position by means of a pawl mechanism (not shown) one member of which is secured to the shaft, the other being secured to the member 1 or to the chassis of the automobile. If desired also one end of the shaft may be provided with a handle, or means for applying a handle thereto, which may be used for turning said shaft.

In Figs. 3, 4 and 5 those members which have the reference numerals corresponding with members of Figs. 1 and 2 also correspond with the last mentioned members. However, in the embodiment shown in Figs. 3–5 the coupling member secured to the automobile is composed of two parts 23 and 24 which may be detached from each other.

The member 4 is in this embodiment secured between the flanges 2, 3 of the member 23. The latter one has the shape of an inclined cone.

The member 23 fits into a correspondingly shaped sleeve 24 which by means of lugs 25 may be attached to the frame 26 of the automobile. Into the upper wall of the sleeve 24 is threaded an obliquely placed threaded rod 27 by means of which the members 23 and 24 may be secured to each other, the inner end of the threaded rod being screwed into and resting against the end wall 28 of a recess 29 provided in the member 23. The sleeve 24 is provided with extensions 30 which, when the screw 27 is tightened, abuts against the member 4 or knots 31 provided thereon, so that a non-rattling connection is obtained.

The trailer A and the automobile B may be interconnected by means of the above mentioned bolt 6. However, if the trailer is loaded, it is difficult to raise the frame 12 and move the parts together, and as a rule it has been necessary that several men work together. By the present construction of the members 23 and 24 a wire 32 may be secured to the narrow end of the cone-shaped member 23 and extended through the sleeve 24 to a hauling device 33 provided on the automobile, which device may be operated by a handle 34 or may be driven from the motor of the automobile. By operating said device 33 the members 23 and 24 thus may be drawn together.

Thus when a loaded trailer, resting at its front end on the wheel 35 is to be connected to the automobile, the member 23 is loosened by screwing out the screw 27 which for this purpose is extended to the rear of the vehicle and provided at its free end with a suitable wheel 36 or the like. Then the member 23 is drawn backwards, wire 32 simultaneously being given out from the device 33, and when the trailer's front end is reached the member 23 is connected to the member 4 of the trailer by insertion of the bolt 6 as previously described. Then the device 33 is operated and the trailer drawn on to the vehicle whereupon the front end of the trailer is raised somewhat and the member 23 drawn into the sleeve 24 and secured by means of the screw 27.

As will be understood the details of the embodiments here illustrated and described may be altered in several ways without departing from the invention.

Having now particularly described and ascertained the nature of my said invention and in what manner the same is to be performed, I declare that what I claim is:

1. A coupling arrangement for dirigible vehicle trailers comprising a universal link connected to the front end of the trailer frame, a coupling member connecting said universal link and the steering rod of the trailer, a coupling member secured to the vehicle, an insertion bolt for detachably securing said members together and means interposed between the coupling members on each side of a longitudinal line through the axis of said bolt for holding the members in rigid relative relation and also holding the detachable member in continuous contact with the insertion bolt.

2. A coupling arrangement as claimed in claim 1, characterized in that the detachable coupling member is provided with a slot for adjustable connection with the trailer steering rod.

3. An arrangement as claimed in claim 1, characterized by the provision of a brake cylinder device secured to the coupling member and cooperating with a piston secured to the vehicle and controllable from the driver's seat.

4. A coupling arrangement as claimed in claim 1, characterized by the provision of a brake cylinder device secured to the coupling member and cooperating with a piston secured to the vehicle and controllable from the brake mechanism of the vehicle.

5. A coupling arrangement according to claim 1 having an eccentric mechanism interposed between the coupling members.

6. A coupling arrangement for dirigible vehicle trailers comprising a universal link connected to the front end of the trailer frame, a coupling member connecting said universal link and the steering rod of the trailer, a conical coupling member detachably secured to said coupling member by an insertion bolt, a conical shaped sleeve member secured to the vehicle, a screw for securing the conical coupling member into the sleeve member and means interposed between the first named coupling member and the sleeve member on each side of a longitudinal line through the axis of said bolt for holding the members in rigid relative relation and also holding the detachable member in continuous contact with the insertion bolt.

7. A coupling arrangement according to claim 6 in which the sleeve member is provided with knots which when the sleeve and the conical member are connected rests against the coupling member connecting the universal link and the steering rod.

8. A coupling arrangement according to claim 6 in which a wire is secured to the conical member and is passed through the sleeve member to a tightening means for said wire.

In testimony whereof I affix my signature.

LUDVIK ISACHSEN.